R. H. SIMONDS.
METHOD OF MANUFACTURING SPECTACLE FRAMES.
APPLICATION FILED AUG. 11, 1905.
931,508.
Patented Aug. 17, 1909.
2 SHEETS—SHEET 1.
Fig. 1.
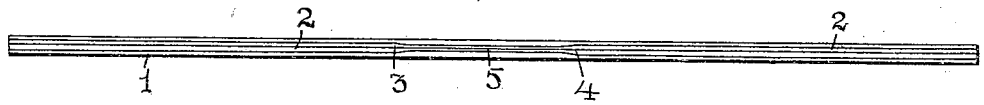
Fig. 2.
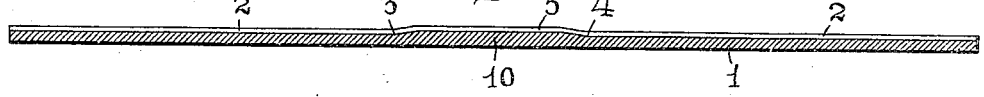
Fig. 3.
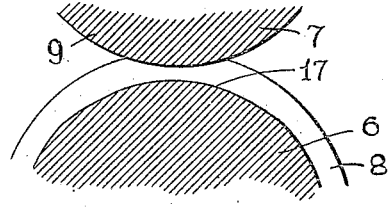
Fig. 4.
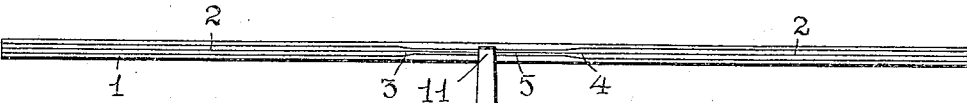
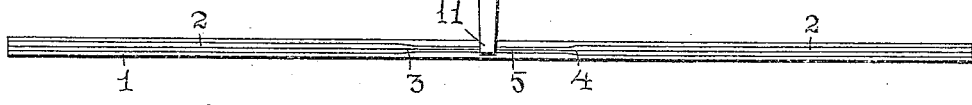
Fig. 5.    Fig. 6.    Fig. 7.
Witnesses
Roy D. Tolman.
Penelope Comberbach.
Inventor
Royal H. Simonds.
By Rufus B. Fowler
Attorney

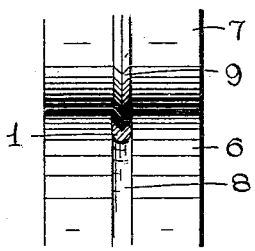
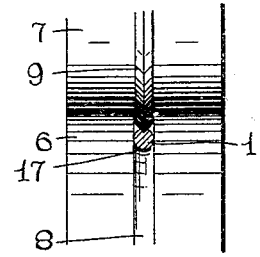
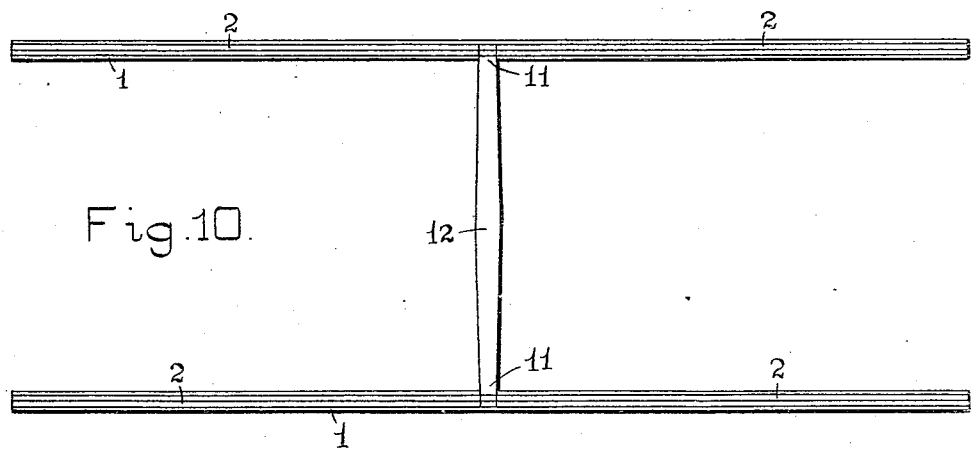
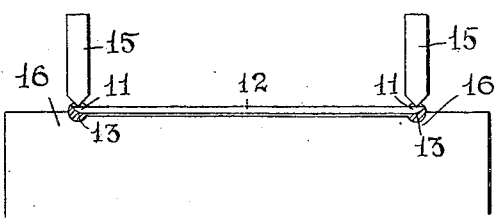

UNITED STATES PATENT OFFICE.

ROYAL H. SIMONDS, OF SOUTHBRIDGE, MASSACHUSETTS.

METHOD OF MANUFACTURING SPECTACLE-FRAMES.

No. 931,508.   Specification of Letters Patent.   Patented Aug. 17, 1909.

Application filed August 11, 1905. Serial No. 273,763.

*To all whom it may concern:*

Be it known that I, ROYAL H. SIMONDS, a citizen of the United States, residing at Southbridge, in the county of Worcester and Commonwealth of Massachusetts, have invented a new and useful Improvement in Methods of Manufacturing Spectacle-Frames, of which the following is a specification, accompanied by drawings forming a part of the same, in which—

Figure 1 represents a piece of grooved wire for forming the eye wire of the spectacle frame. Fig. 2 is a central longitudinal sectional view of the same. Fig. 3 represents a sectional view of a pair of grooving rolls for forming the groove in the eye wire. Fig. 4 represents the two grooved eye wires with a connecting bridge soldered thereto. Fig. 5 is a cross sectional view of a grooved eye wire. Fig. 6 is a cross sectional view of a grooved eye wire showing the end of the bridge soldered thereto. Fig. 7 is an end view of a grooved eye wire with the bridge attached thereto showing the form of the groove after the operation of swaging. Fig. 8 is a diagrammatic view showing the action of the grooving rolls in forming the groove in the eye wires, and Fig. 9 is a diagrammatic view showing the action of the grooving rolls in forming a shallow groove at the central section of the eye wire. Fig. 10 represents a pair of eye wires with the bridge attached after the operation of swaging has been completed in order to form grooves of uniform depth throughout the entire length of the eye wires, and Fig. 11 is a diagrammatic view illustrating the operation of swaging the central section of the eye wire.

Similar reference letters and figures refer to similar parts in the different views.

The object of my invention is to produce a spectacle frame in which that section of the eye wires to which the ends of the bridge are soldered may be stiffened after the operation of soldering the bridge to the eye wires by which the eye wires have become soft by the action of the heat required in soldering.

It is the further object of my invention to enable this stiffening of the eye wires to be accomplished after a triangular groove has been formed throughout the entire length of the eye wire, which enables the subsequent operation of swaging the softened section of the eye wire to be accomplished by my improved method of manufacture with greater facility and accuracy.

My improved method consists in forming a triangular groove throughout the entire length of the eye wire, said groove being of the proper depth to suitably inclose the edge of the lenses, except at the central portion of the eye wire at which the triangular groove is reduced in depth throughout that section of the eye wire which is subjected to the influence of heat in soldering the bridge. The ends of the bridge are then soldered in any convenient and known method, but preferably by forming a notch on the inner or grooved side of the eye wire, said notch having a curved bottom adapted to receive the curved or rounded end of the bridge. The eye wires and bridge soldered thereto are then completed by swaging the central section of the eye wires to increase the depth of the shallow triangular groove to equal the depth of the groove throughout the remaining portion of the eye wires and at the same time to form a correspondingly triangular groove through the end of the bridge, thereby forming a continuous uniform triangular groove throughout the entire length of the eye wire. The final swaging action at the central section of the eye wires serves to harden the metal and to restore the stiffness of the wire which has become softened by the action of the heat in soldering the bridge to the eye wires.

It has been the practice heretofore to restore the stiffness to the eye wires which has been reduced by heating either by forming the groove throughout the entire length of the eye wires after the operation of soldering has been performed, or by forming the usual groove throughout that portion of the eye wires which is unaffected by the heat of soldering the bridge and forming a shallow groove at the central section of the eye wire by cutting away the apex of the triangular grooving roll, thereby forming a shallow groove having a broad and flattened bottom.

By my improved method the initial groove formed in the eye wires before the soldering of the bridge thereto is triangular in cross section throughout its entire length which facilitates the process of swaging and enables it to be accomplished with greater accuracy.

Referring to the accompanying drawings 1 denotes an eye wire of a spectacle frame having a longitudinal triangular groove 2 to receive the lens. The triangular groove 2 is of uniform depth except at the central section of the wire where, between the points 3 and 4 a groove 5 is formed, triangular in cross section, but of less depth. The longitudinal groove is formed by rolling the eye wire between a pair of rolls 6 and 7, the roll 6 having a groove 8 to receive the eye wire and the roll 7 having a triangular rib 9, Figs. 8 and 9, adapted to form a triangular groove in the upper surface of the eye wire as it passes between the rolls. The rib 9 is of uniform size around the entire periphery of the roll 7 and the groove 8 is of suitable depth to cause the triangular groove 2 to be formed in the wire by the rib 9, except at the point where the central section of the wire passes between the rolls. At this section the groove 8 is made slightly deeper, so that the triangular groove 5 formed at this section of the wire will have a less depth than the triangular groove 2 and consequently leave the wire thicker at the bottom of the groove 5, as shown at 10, Fig. 2. At the center of the two eye wires notches are cut of sufficient width to receive the ends 11, 11, of a bridge 12. These notches are formed with a curved bottom 13, as shown in Fig. 6, and the under side of the ends 11 of the bridge 12 are correspondingly curved, as shown at 14, Fig. 6, to fit the curved bottom 13 of the notches. This allows the notches to be formed by a rotating circular mill and also increases the surfaces in contact over a notch having a flat bottom. The ends of the bridge are inserted in the notches formed in the eye wires and securely soldered. The short shallow grooves 5 in the central sections of the eye wires are then deepened by compressing of the wire to correspond with the depth of the grooves 2, thereby forming a continuous groove throughout the entire length of the eye wire of uniform depth. The deepening of the groove at the central section of the wires may be accomplished by rolling or preferably swaging, but in either case the shallow groove 5 already formed in the central section of the wires serves to accurately center the swaging tool in alinement with the grooves 2 and as the point of the swaging tool enters and fills the shallow groove 5 it prevents the rocking or displacement of the eye wire during the operation of compression. The action of compression not only deepens the shallow groove 5, but it also forms a groove through the end 11 of the bridge, as shown in Fig. 10. The deepening of the shallow groove 5 by swaging renders the wire of uniform thickness at the bottom of the groove, as shown in sectional view in Fig. 11.

The operation of soldering the ends of the bridge to the eye wires tends to soften the metal for some distance upon each side of the soldered joint and reduces the stiffness of the eye wire. The operation of swaging, however, by compressing the metal between the swaging tool 15, Fig. 11, and the anvil 16, hardens the metal and restores the stiffness of the eye wire throughout the section which has been softened by heating. Fig. 3 shows the deepening of the groove 8 at 17 in order to form the shallow groove 5.

What I claim as my invention and desire to secure by Letters Patent is:—

1. The within described method of making a spectacle frame, comprising forming a longitudinal groove in the eye wire, said groove having a portion of less depth than the remainder of the groove, soldering the end of the bridge across the shallow portion of said groove, and compressing the shallow portion of said groove and the end of said bridge across it to increase the depth of said shallow portion.

2. The within described method of making a spectacle frame, consisting in forming a longitudinal groove in the eye wires, said groove having a portion of less depth than the remainder of the groove, thereby forming thickened sections in the eye wires, soldering the ends of the bridge to the grooved sides of the eye wires and at the thickened sections thereof, compressing the thickened sections to increase the depth of the groove, and forming a groove in the ends of the bridge transversely thereto and in alinement with the groove in the eye wires.

3. The within described method of making a spectacle frame comprising, forming a longitudinal triangular groove in a portion of the eye wire, soldering the end of the bridge across said triangular groove and compressing said triangular groove and the end of said bridge by centering a compressing tool in said triangular groove.

4. The within described method of making a spectacle frame, comprising forming a longitudinal triangular groove in a portion of the eye wire, forming a notch in said eye wire across said triangular groove to receive the end of the bridge, and forming a groove in the end of said bridge by a compressing tool centered in said triangular groove.

5. The within described method of making a spectacle frame, comprising forming a longitudinal groove in the eye wire, said groove having a triangular portion of less depth than the remainder of the groove, soldering the end of the bridge to the eye wire at said shallow portion of the groove, and deepening said shallow portion of the groove by a compressing tool centered in said triangular groove.

ROYAL H. SIMONDS.

Witnesses:
RUFUS B. FOWLER,
PENELOPE COMBERBACH.